United States Patent [19]

Javet et al.

[11] Patent Number: 5,766,276

[45] Date of Patent: Jun. 16, 1998

[54] METHOD FOR SUPPLYING NATURAL GAS TO A CATALYTIC BURNER AND DEVICE FOR IMPLEMENTING SAID METHOD

[75] Inventors: Alain Javet, deceased, late of Petit-Lancy, Switzerland; Michele Javet, heir, Berlin; Claudio Javet, heir, Heppenheim, both of Germany; Gerard Capitaine, Genthod, Switzerland

[73] Assignee: Radiamon S.A., Le Locle, Switzerland

[21] Appl. No.: 300,549

[22] Filed: Sep. 7, 1994

Related U.S. Application Data

[63] Continuation of Ser. No. 651,398, Jul. 24, 1992, abandoned.

[30] Foreign Application Priority Data

Jun. 27, 1989 [CH] Switzerland ............................ 2396/89

[51] Int. Cl.⁶ ...................................................... C01B 3/24
[52] U.S. Cl. ......................... 48/198.7; 48/127.3; 422/198;
422/200; 423/242.1; 423/245.3; 431/7;
431/10; 431/11; 431/268
[58] Field of Search ............................... 431/7, 10, 11,
431/268, 328; 422/220, 198; 48/198.7,
127.9, 195, 127.3; 423/242.1, 245.3; 585/868

[56] References Cited

U.S. PATENT DOCUMENTS

| | | | |
|---|---|---|---|
| 2,018,582 | 10/1935 | Theunissen | 431/328 |
| 2,095,065 | 10/1937 | Hays | 431/7 |
| 3,191,659 | 6/1965 | Weiss | 431/328 |
| 3,415,628 | 12/1968 | Freund et al. | 431/328 |
| 3,810,732 | 5/1974 | Koch | 431/7 |
| 4,189,297 | 2/1980 | Bratko et al. | 431/328 |
| 4,421,476 | 12/1983 | Gulden et al. | 431/328 |
| 4,459,126 | 7/1984 | Krill et al. | 431/7 |
| 4,528,170 | 7/1985 | Koecker et al. | 423/245.3 |
| 4,822,578 | 4/1989 | Busse et al. | 423/245.3 |
| 4,938,685 | 7/1990 | Noakes et al. | 431/7 |
| 5,106,590 | 4/1992 | Hopper et al. | 422/220 |
| 5,165,884 | 11/1992 | Martin et al. | 431/7 |
| 5,215,456 | 6/1993 | Fujiwara | 431/7 |
| 5,261,812 | 11/1993 | Javet et al. | 431/328 |

FOREIGN PATENT DOCUMENTS

| | | |
|---|---|---|
| 1304454 | 8/1962 | France . |
| 1495494 | 9/1967 | France . |
| 2273998 | 1/1976 | France . |

(List continued on next page.)

OTHER PUBLICATIONS

Zingel, "Der Gas–Catalyt–Dunkelstrahler in der industriellen Anwendung", Gaswarme Band 12, pp. 156, Nr. 4, Apr. 1963.

Ackeret, Fluid Mechanics Of Internal Flow, "Aspects of Internal Flow"pp. 10–14, Elsevier Pubishing Company, 1967.

Patent Abstracts of Japan, vol. 11, No. 166 (M–593) (2613), 28 May 1987.

Patent Abstracts of Japan, vol. 9, No. 184 (C–294) (1907), 30 Jul. 1985.

D. Jones et al, Combustion Catalytique et Gaz Naturel, Revue Generale de Thermique, Jun.–Jul. 1989, vol. 28, No. 330–331, pp. 401–406.

*Primary Examiner*—Hien Tran
*Attorney, Agent, or Firm*—Cushman Darby & Cushman Intellectual Property Group of Pillsbury Madison & Sutro, LLP

[57] ABSTRACT

The distribution-pressurized natural gas is supplied via a conduit arranged in the piston of an electrovalve in a nozzle of which the outlet leads to a cone which provides, with the nozzle, a ring-shaped opening which, connected to the atmosphere, acts as a secondary nozzle for injecting air into the gas flow. The cone is followed by a cylindrical element then by an abrupt widening section which opens into a heat exchanger which is in contact with a substrate impregnated with a catalytic material which oxidizes fuel gas. A small amount of air is sucked up by the widening and mixed with the gas. This mixture is then treated in the exchanger up to the transformation temperature of the sulphur-containing compound and the sulphur is then oxidized.

6 Claims, 2 Drawing Sheets

FOREIGN PATENT DOCUMENTS

| | | |
|---|---|---|
| 2496838 | 6/1982 | France . |
| 2607024 | 5/1988 | France . |
| 2720866 | 11/1978 | Germany . |
| 207965 | 3/1984 | Germany .............................. 431/284 |
| 57-792624 | 6/1982 | Japan ..................................... 431/268 |
| 58-123013 | 7/1983 | Japan ......................................... 431/7 |
| 59-195024 | 11/1984 | Japan ..................................... 431/258 |
| 60-30908 | 2/1985 | Japan ..................................... 431/268 |
| 60-120114 | 6/1985 | Japan ..................................... 431/268 |
| 61-291816 | 12/1986 | Japan ..................................... 431/268 |
| 62-050734 | 3/1987 | Japan . |
| 62-50723 | 3/1987 | Japan . |
| 62-57887 | 3/1987 | Japan . |
| 61-140715 | 6/1996 | Japan ..................................... 431/268 |

METHOD FOR SUPPLYING NATURAL GAS TO A CATALYTIC BURNER AND DEVICE FOR IMPLEMENTING SAID METHOD

This is a continuation of application Ser. No. 07/651,398, filed on Jul. 24, 1992.

BACKGROUND OF THE INVENTION

1. Field of the Invention

The present invention relates to a method for supplying natural gas to a catalytic burner containing a sulfur compound in the form of an additive, and to a device for implementing said method.

2. Description of the Related Art

Since certain natural gases are practically odorless, there is a law requiring that an additive be incorporated in them to make them detectable by odor. Such additives are generally sulfur compounds, such as tetrahydrothiophene (THT). In the conventional flame burners the heat causes the decomposition of the compound and the sulfur is oxidized. Since the combustion temperature in a catalytic burner, being between 350° C. and 700° C., is much lower than in a conventional burner, the oxidation of the sulphur in certain, less hot zones of the catalyzer may be incomplete and it has been noted that sulfur contamination of the catalyzer occurs in these zones, rendering the catalyzer inoperative. The contaminated zone spreads from there and the catalyzer quickly becomes unusable. For this reason the catalytic burners operating with distribution systems for natural gas, to which odorous compounds of the THT type have been added, encounter serious sulfur contamination problems.

There are numerous applications where a catalytic burner has advantages in comparison to other types of combustion, provided that it does not form noxious gases, such as CO or $NO_x$, thus allowing for a reduction in atmospheric pollution, since heating constitutes an important factor in regard to this pollution. The absence of noxious gases in the combustion gases produced by catalytic burning allows direct use of these gases for the heating of premises. Clearly, these advantages lie in the protection of the environment and imply an important energy savings.

It has already been proposed in Japanese JP-A-61-295408 to reduce the noxious effects of sulfur on the catalytic metal and to prolong the service life of the combustion catalyzer by means of a first catalyzer constituting a mixture of an oxidation and de-sulfurization catalyst on a carrier consisting of a porous ceramic fiber assembly, and a second catalyzer constituted only by the oxidation catalyzer. This process requires two catalyzers, which considerably increases the cost of this apparatus.

Japanese JP-A-60-54903 also relates to the removal of an odorous, sulfur-based agent, comprising a de-sulfurization catalyzer and a reforming catalyzer.

German DE-A-2720866 relates to a catalyzer for eliminating noxious substances from exhaust gases. These are pre-heated below the combustion temperature by being bubbled through an oil bath, above which a catalyzer structurally similar to a fabric is located. The catalyzer heats the fabric by radiation in such a way that the exhaust gases are additionally heated by 10° C. to 20° C. more when moving through the fabric and are at combustion temperature when reaching the catalyzer. Thanks to this method the contamination of the catalyzer by sulfur compounds is surprisingly avoided.

SUMMARY OF THE INVENTION

It can be seen that although this problem has already been approached, the proposed solutions are either based on the use of two catalyzers, considerably increasing the cost of the apparatus, or they are not suited to the problem of de-sulfurization of a combustion gas.

The purpose of the present invention is to provide a solution allowing the resolution of this problem in a simple, inexpensive and efficient manner.

To this end, the object of the invention is a method for oxidizing a sulfur compound contained in a natural gas in the form of an additive before burning the gas in a catalytic burner. It is a further object of the present invention to provide a device for implementing this method.

The advantages of the proposed method are important to the extent that the efficiency of the method and the device for implementing it have been demonstrated in the course of long-term testing, which has not disclosed any contamination of the catalyzers used in the burners. The device required for implementing the method is simple and cheap to manufacture. The fact that it does not contain any moving pieces, nor require maintenance or control therefore does not drive up the particular cost of operation. The use of very small amounts of air which, depending on the proportion of sulfur to be oxidized, have been added to the natural gas distribution system in amounts of 10 to 15 ppm, practically does not change the combustion characteristics. Finally, since the output of energy necessary for heating the gas and air mixture is very small, heating is performed by the burner itself. In effect, measurements show that the temperature in the interior of the catalytic materials remains almost constant and above the thermo-chemical decomposition temperature of the sulfur-containing molecules, which is the temperature at the outer surface of the catalytic materials.

The fact remains that the realization of this process poses a multitude of problems and that the device for putting it into action is far from being obvious to realize. It is actually necessary to move amounts of air, which are also as small as possible, by means of the natural gas, the density of which is less than that of the air and where its feed pressure and therefore its speed are very low. Actually, this pressure in the distribution systems of natural gas generally is about 2.3 kPa, so that it is necessary to operate an injector device and to mix the fluids of natural gas and air, based on the diameter of the nozzle, at very low Reynolds numbers, less than 10.000. At the same time, the realization of this process is further complicated by the fact that, while concurrently addressing the above-mentioned multitude of problems, the device must operate at 30% of the nominal output of natural gas passing through nozzle BG. Actually all modifications of the cross sections of flow will require a control system, will increase the cost of the apparatus to an unacceptable degree and will decrease its efficiency.

BRIEF DESCRIPTION OF THE DRAWINGS

The attached drawings show schematically and by way of example an embodiment of the device for implementing the method in accordance with the present invention.

DETAILED DESCRIPTION OF THE PRESENTLY PREFERRED EXEMPLARY EMBODIMENTS

The device for implementing the method in accordance with the present invention consists of a source of combustible gas under pressure G, the output of which is controlled in this example by a solenoid valve EV having a piston P traversed by a conduit Cl for the flow of gas. This solenoid valve is not being described here, since it is not a part of the present invention. The outlet of this solenoid valve communicates with a nozzle BG, the outlet of which leads into a cone C comprising, together with the end of the nozzle BG, an annular opening BA which, connected with the ambient air, is used as secondary nozzle for the injection of air into the flow of gas. The cone C is followed by a cylindrical portion with a cross section $S_1$ and then a sudden enlargement BC, called Borda-Carnot, with a cross section $S_2$, which leads into a heat exchanger EC, which is in contact with a substrate impregnated with a catalytic material MC for the oxidation of the combustible gas supplied under pressure G. The proportion between the length of this section BC and the diameter of the section $S_2$ should be approximately 8 to 12.

The method of the present invention comprises the aspiration of a small quantity of air by means of the pressure drop created by the sudden enlargement BC provided downstream of the nozzles BA and BG. At the same time and as described below, the sudden enlargement causes strong turbulence in the flow as well as relatively low flow speeds, thus assuring homogenous mixing of the air and the combustible gas. This mixture is then introduced into the heat exchanger, where it is heated to a temperature of at least 530° C., at which the tetrahydrathiophene (THT) molecules decompose and the sulfur is liberated, which oxidizes upon contact with the oxygen in the air present in the mixture. Accordingly, when the combustible mixture is brought into contact in the catalytic burner with a new supply of air intended for oxidation of the fuel, the sulfur is found to be in the form of $SO_2$, which does not contaminate the catalyzer.

As outlined above, the implementation of this process poses problems, the solution of which is very ticklish. The density of the driving fluid, much less than that of the driven fluid, the kinematic viscosity of the gaseous fluids, much higher than that of the liquids, as well as the slow speed of the gas due to the low feed pressure of the natural gas, implying Reynolds numbers less than 10,000, constitute operational conditions which are entirely unusual.

Figure 1:
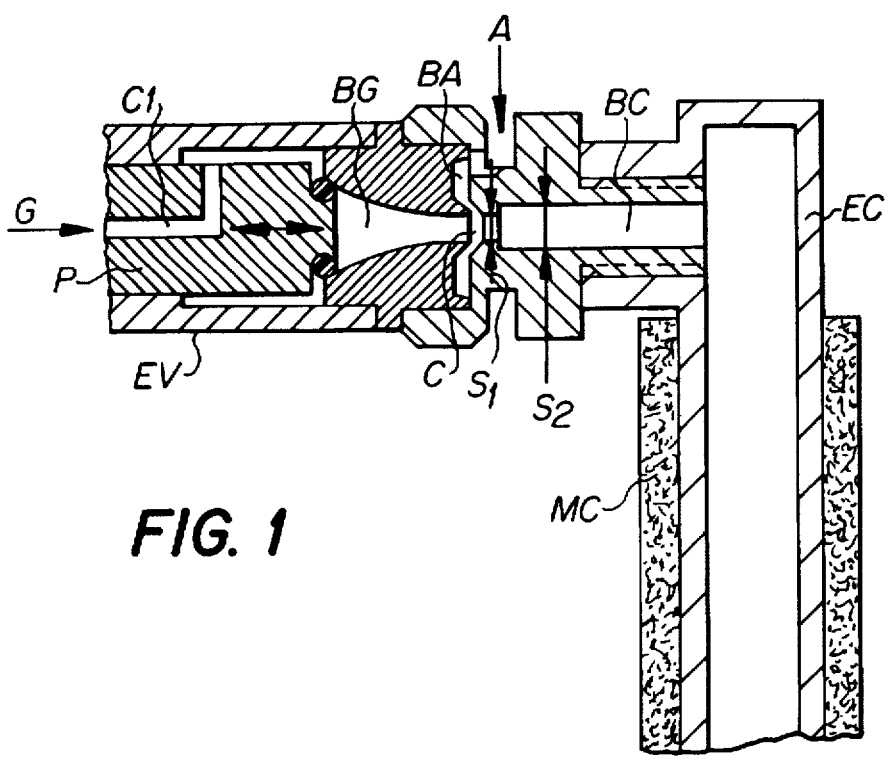
FIG. 1 is a schematic sectional view of the device.
Figure 2:
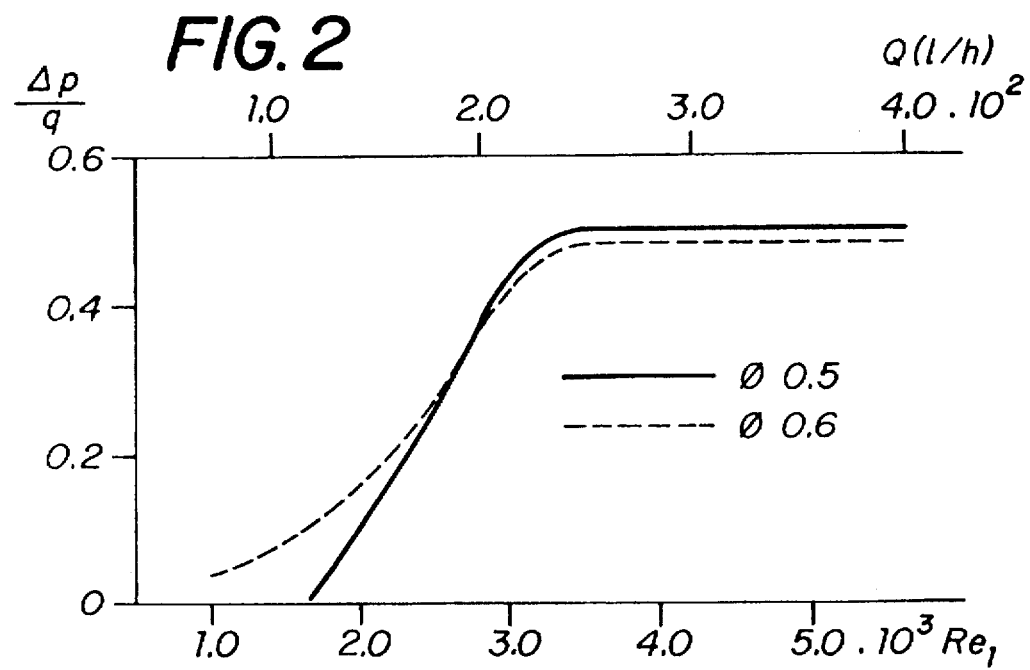
FIG. 2 is a diagram of the pressure gain of the sudden enlargement of the injector device as a function of the Reynolds number.

These reasons have led the inventors to replace the conventional cone diffuser with a sudden enlargement, called Borda-Carnot. Actually, with the Reynolds numbers under consideration, the cone diffuser does not provide an assurance of the stability of the flow, the more so since the output and thus the speed and the Reynolds number are said to be reduced to 30% of the nominal output, according to the power demanded by the burner. On the other hand, if the sudden enlargement has a less effective yield, its operation is better known with low Reynolds numbers and, as shown in the diagram of FIG. 2, makes it possible to obtain, starting with a Reynolds number of approximately 3,000 and with sections $S_1/S_2$ of the sudden enlargement having a proportion of 0.5 to 0.6, an increase in maximum pressure $\Delta p/q$ of about 0.5, q being the dynamic pressure in the neck of the nozzle, and also makes it possible to operate at a Reynolds number of 2,000, based on the flow conditions in the neck of the nozzle. These indications come from the Memento of Head Losses of Idelcik (Eyrolles).

The diffuser leads into the exchanger EC, which is in contact with the substrate impregnated with the catalytic material MC. In this case the substrate is a material formed of heat-resistant fibers, impregnated with platinum. The exchanger can be formed by a simple tube of the proper cross section and length, or by two tubes coaxially disposed one inside the other, thus assuring a counter-current flow in the annular space between the tubes, as well as in the central tube. The cross section of this tube must be selected so that an acceptable head loss is generated, taking into account the supply pressure of the natural gas.

Figure 3:
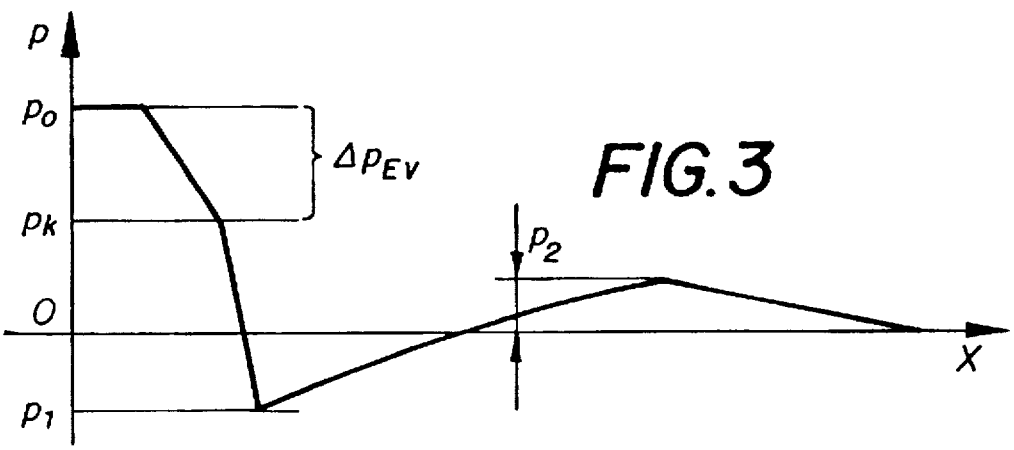
FIG. 3 is a diagram of the pressures in the device of FIG. 1.

The diagram of FIG. 3 illustrates schematically the value of the pressures at various locations of the device in comparison to the ambient pressure, which corresponds to the axis x. $p_o$ corresponds to the pressure at the inlet of the solenoid valve EV. $\Delta p_{EV}$ is the head loss across the solenoid valve. $p_k$ corresponds to the pressure at the inlet of the injector device and $p_1$ to that obtaining in the neck of the injector device, the one which is to aspirate the ambient air. $P_2$ is the pressure at the inlet of the heat exchanger, the exit being practically at ambient pressure.

An example of the size of a device for treating a natural gas, supplied at a pressure of 2.3 kPa with a nominal flow of 0.50 m³/h is given below, which is intended to supply a heating apparatus with catalytic burner of 5 kW. In this example the conduit C1, provided in the piston P of the solenoid valve EV has a diameter of 3 mm, and the nozzle BG has a diameter of 1.5 mm, the small diameter of the diffuser is 1.6 mm and that of the sudden enlargement 2.2 mm. The hydraulic diameters of the counter-current exchanger are approximately 3 to 5 mm, and its length is 34 cm. The table below gives the values for the pressures $p_o$,m. $p_1$ and $p_2$ at different flow rates of the gas Q.

| Q l/h | $p_o$ Pa | $p_1$ Pa (measured) | $p_1$ Pa (calculated) | $p_2$ Pa |
|---|---|---|---|---|
| 432 | 1700 | −830 | −640 | 80 |
| 308 | 900 | −350 | −320 | 40 |
| 200 | 380 | −130 | −108 | −0 |
| 136 | 250 | −50 | −20 | −0 |

It can be seen that $p_1$ is below the ambient pressure in connection with all the flow rates considered, for the calculated as well as the measured values. In this connection a certain imprecision should be pointed out due to the measuring equipment available as well as certain fluctuations in the pressure of the distribution system.

With the catalytic material MC at a temperature on the order of 700° C., the temperature of the mixture of the gas at the outlet of the heat exchanger EC was calculated such that it should be on the order of 550° C. Tests have been performed with a heating apparatus with catalytic burner supplied with natural gas containing on the order of 15 ppm of THT and treated with the described device. After 4,500 hours of operation no trace of catalyzer contamination was noted. On the other hand, after the air inlet of the second nozzle BA had been blocked, the beginning of contamination of the catalyzer with sulfur was noted. However, it could be seen that this contamination disappeared after the admission of air was reestablished. This experience demonstrates the indispensable role of the air, since a simple pre-heating of the fuel is not sufficient.

It is certain that the proportion of air aspirated in the described case is very largely in excess in comparison to the stoichiometry air-sulfur, taking into account the amount of THT present. This fact has not caused any measurable diminution of the yield of the burner, which confirms the value of this solution.

It is obviously possible to adapt the described device to all manner of catalytic combustion apparatus of various power.

Figure 4:
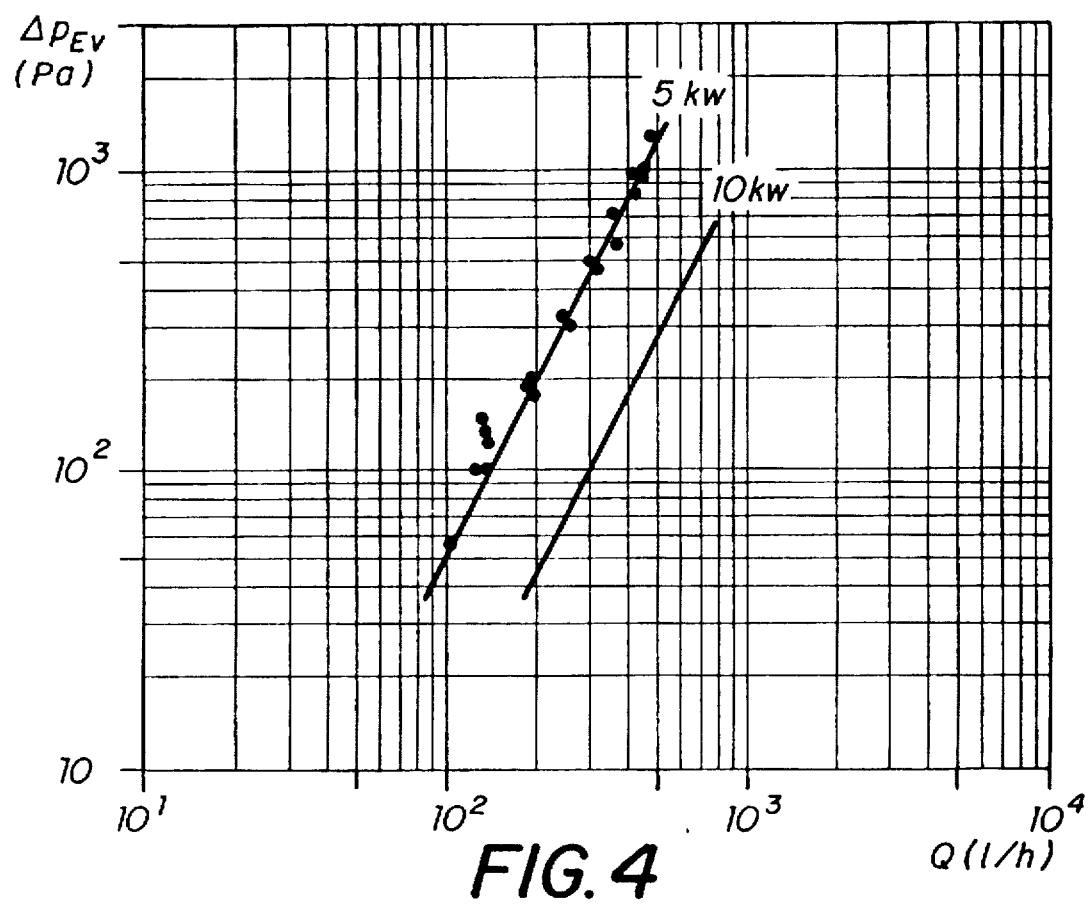
FIG. 4 is a diagram of the total head loss in the solenoid valve.

Therefore, in connection with a heating apparatus of 10 kW, requiring a nominal flow on the order of 1.0 m³/h and also supplied with a pressure of 2.3 kPa, the logarithmic-scale diagram of FIG. 4 in connection with head losses in the solenoid valve system controlling the amount of supply, permits the deduction that, for operating under the same conditions, the diameters of the solenoid valve and of the heat exchanger of the supply device should be multiplied by a factor of about 1.5 in comparison to the 5 kW apparatus, which results in a solenoid valve with a conduit Cl of 4.5 mm across the piston P and a heat exchanger of 9 mm. Given the relatively important diameter of this heat exchanger, it is always possible to increase its effiency by adopting the solution of cross-current flow through two coaxial tubes, as previously mentioned.

In the herein described example, the control of the supply of gas has been realized with the help of a solenoid valve selected to be associated with an electronic control circuit. Nevertheless, it is obvious that any other appropriate control system could replace the solenoid valve described which, as already mentioned, is not a part of the invention.

What is claimed is:

1. A method of oxidizing at least one sulfur compound contained in a natural gas in the form of an additive before burning the natural gas with a catalytic material, said method comprising the steps of:

provoding an injector device comprising a nozzle connected to a natural gas supplying source and cooperating members that collectively define an annular space interconnecting the nozzle to the atmosphere, the nozzle having a diameter and being constructed and arranged to receive the natural gas from the supplying source at a low pressure such that the injector device is operated below a Reynold's number of 10,000;

flowing natural gas from the supplying source to the nozzle under the low pressure to generate a pressure lower than atmospheric pressure in the annular space and thereby aspirating air through the annular space and into the natural gas as the natural gas flows through the nozzle;

providing a diffuser downstream from the nozzle and the annular space and conveying the natural gas and the aspirated air through the diffuser, the diffuser defining first and second passage portions therein, the first passage portion being interposed between the nozzle and the second passage portion, and the second passage portion being configured to have a cross-sectional area sufficiently larger than a cross-sectional area of the first passage portion such that a flow path in the diffuser undergoes a Borda-Carnot enlargement between the first and second passage portions, said Borda-Carnot enlargement being sufficiently large to cause the natural gas and aspirated air to mix together to form a mixture;

heating the mixture until it reaches a temperature of at least 530° C. and thereby decomposing at least one sulfur compound contained in the natural gas to form at least one decomposed compound containing the sulfur; and oxidizing the sulfur of the at least one decomposed compound before burning the natural gas with a catalytic material.

2. A method according to claim 1, wherein the injector device is operated below a Reynold's number of about 3,000.

3. A method according to claim 1, wherein the injector device is operated below a Reynold's number of about 2,000.

4. A method according to claim 1, wherein a ratio of the cross-sectional area of the first passage portion to the cross-sectional area of the second passage portion is in a range of from 0.5 to 0.6.

5. A method according to claim 1, wherein the nozzle is substantially conically shaped about a longitudinal axis extending in a direction between an entrance of the nozzle, which receives the natural gas from the natural gas supplying source, and an exit of the nozzle, which conveys the natural gas and aspirated air to the diffuser, such that the diameter of the nozzle varies along a direction of the longitudinal axis.

6. A method according to claim 1, wherein the at least one sulfur compound is tetrahydrothiophene.

* * * * *